US007051243B2

(12) United States Patent
Helgren et al.

(10) Patent No.: US 7,051,243 B2
(45) Date of Patent: May 23, 2006

(54) RULES-BASED CONFIGURATION PROBLEM DETECTION

(75) Inventors: Matthew J. Helgren, Austin, TX (US); Michael E. Little, Cedar Park, TX (US); Paris E. Bingham, Jr., Aurora, CO (US); Rex G. Martin, Plano, TX (US); Alan J. Treece, St. Peters, MO (US)

(73) Assignee: Sun Microsystems, Inc., Santa Clara, CA (US)

( * ) Notice: Subject to any disclaimer, the term of this patent is extended or adjusted under 35 U.S.C. 154(b) by 443 days.

(21) Appl. No.: 10/135,483

(22) Filed: Apr. 30, 2002

(65) Prior Publication Data

US 2003/0204791 A1 Oct. 30, 2003

(51) Int. Cl.
*G06F 11/00* (2006.01)

(52) U.S. Cl. .............................. 714/48; 714/26; 714/37

(58) Field of Classification Search .................. 714/48, 714/37, 26, 47
See application file for complete search history.

(56) References Cited

U.S. PATENT DOCUMENTS

| 4,447,846 A | 5/1984 | McCleery |
| 4,853,873 A | 8/1989 | Tsuji et al. |
| 5,111,384 A | 5/1992 | Aslanian et al. |
| 5,175,800 A | 12/1992 | Galis et al. |
| 5,179,695 A | 1/1993 | Derr et al. |
| 5,287,505 A | 2/1994 | Calvert et al. |
| 5,335,341 A | 8/1994 | Chana |
| 5,664,093 A | 9/1997 | Barnett et al. |
| 5,678,002 A | 10/1997 | Fawcett et al. |
| 5,826,250 A | 10/1998 | Trefler |
| 5,862,322 A | 1/1999 | Anglin et al. |
| 5,867,714 A | 2/1999 | Todd et al. |
| 5,897,630 A | 4/1999 | Schneider |
| | | Huddleston Virta et al. |
| 5,922,079 A | 7/1999 | Booth et al. |
| 5,944,839 A | 8/1999 | Isenberg |
| 5,960,170 A | 9/1999 | Chen et al. |

(Continued)

FOREIGN PATENT DOCUMENTS

EP        367 377         5/1990

(Continued)

OTHER PUBLICATIONS

Search Report from UK Patent Application No. 0309485.1, mailed Nov. 27, 2003, 6 pages.

(Continued)

*Primary Examiner*—Robert W. Beausoliel, Jr.
*Assistant Examiner*—Yolanda L. Wilson
(74) *Attorney, Agent, or Firm*—Robert C. Kowert; Meyertons, Hood, Kivlin, Kowert & Goetzel, P.C.

(57) ABSTRACT

A system and method for identifying problems with a system configuration may evaluate system configuration information against one or more configuration recommendations or rules. The evaluated system configuration may include various types of software and hardware components which may impact the operations of the computer system. Rules may be any information identifying an issue or describing a recommended configuration for the software or hardware component. A knowledge-based language or a programming language analyzer may be used to specify the rules. In one embodiment, a rules engine may be used as part of the problem detection application to evaluate configuration data against associated rules. A rules engine may be any mechanism used to recognize, interpret and process the configuration data against the rules. The results of the evaluation process may be stored for further analysis.

44 Claims, 8 Drawing Sheets

U.S. PATENT DOCUMENTS

| | | | |
|---|---|---|---|
| 5,974,568 A | 10/1999 | McQueen | |
| 6,029,258 A | 2/2000 | Ahmad | |
| 6,170,065 B1 | 1/2001 | Kobata et al. | |
| 6,219,626 B1 | 4/2001 | Steinmetz et al. | |
| 6,298,308 B1 | 10/2001 | Reid et al. | |
| 6,327,677 B1 * | 12/2001 | Garg et al. | 714/37 |
| 6,349,335 B1 * | 2/2002 | Jenney | 709/224 |
| 6,470,464 B1 * | 10/2002 | Bertram et al. | 714/37 |
| 6,487,677 B1 | 11/2002 | Jantz et al. | |
| 6,529,954 B1 | 3/2003 | Cookmeyer, et al. | |
| 6,532,408 B1 | 3/2003 | Breed | |
| 6,549,893 B1 | 4/2003 | Lannert et al. | |
| 6,560,592 B1 | 5/2003 | Reid et al. | |
| 6,604,141 B1 | 8/2003 | Ventura | |
| 6,615,172 B1 | 9/2003 | Bennett et al. | |
| 6,629,267 B1 | 9/2003 | Glerum et al. | |
| 6,633,782 B1 | 10/2003 | Schleiss et al. | |
| 6,633,876 B1 | 10/2003 | Heatlie | |
| 6,678,639 B1 | 1/2004 | Little et al. | |
| 6,681,348 B1 | 1/2004 | Vachon | |
| 6,701,514 B1 | 3/2004 | Haswell et al. | |
| 6,738,928 B1 | 5/2004 | Brown | |
| 6,738,932 B1 | 5/2004 | Price | |
| 6,742,141 B1 | 5/2004 | Miller | |
| 6,859,893 B1 | 2/2005 | Hines | |
| 2002/0073195 A1 * | 6/2002 | Hellerstein et al. | 709/224 |
| 2002/0078404 A1 | 6/2002 | Vachon et al. | |
| 2002/0095615 A1 | 7/2002 | Hastings et al. | |
| 2003/0028825 A1 * | 2/2003 | Hines | 714/37 |
| 2003/0028857 A1 | 2/2003 | Zagorski et al. | |

FOREIGN PATENT DOCUMENTS

GB     2 383 854     7/2003

OTHER PUBLICATIONS

Service Pack Manager 2000, User Manual, "Gravity Storm Software," Gravity Storm Software, LLC, 1999-2002, pp. 1-54.

Patwardhan, et al., "Perl in a Nutshell," O'Reilly, Dec. 1998, ISBN: 1-56592-286-7, 1 page.

Steve Oualline, "Practical C Programming," 3$^{rd}$Edition, O'Reilly, Aug. 1997, ISBN: 1-56592-306-5, 3 pages.

Pittelli, et al., "Reliable Scheduling in a TMR Database System, " ACM, Feb. 1999, 2 pages.

"XML —The Benefits," Version found via "The Way Back Machine," Feb. 26, 2000, http://www.softwareag.com/xml/about/xml_ben.html, 3 pages.

Janice Winsor, "Solaris 8 System Administrator's Reference," Prentice Hall PTR, Sep. 7, 2000, ISBN: 0-13-027701-0, 2 pages.

Paul McFedries, "Windows 98 Unleashed, " Sams Publishing, Mar. 12, 1998, ISBN: 0-672-31235-2, 4 pages.

"RS232 Interface: A Tutorial," Version from Oct. 4, 1999 found via "The Way Back Machine," http://arcelect.com/rs232.html, 2 pages.

"How Does Human Memory Compare with Computer Memory," Version from Nov. 11, 1999 found via "The Way Back Machine," http://www.scism.sbu.ac.uk/inmandw/tutorials/memory/qu8.htm, 4 pages.

Alligator Descartes, et al., "Programming the Perl DBI," O'Reilly and Associates, Feb. 2000, ISBN: 1-56592-699-4, 2 pages.

Michael Caplinger, "Graphical Database Browsing," ACM, 1986. 0-89791-210-1/86/1000-0113, 1 page.

James Kavicky, et al., "An Expert System for Diagnosing and Maintaining the AT&T 3B4000 Computer: An Architecture Description," ACM, Jun. 1989, pp. 36-45.

Rob McGregor, "Practical C ++," Que, Aug. 11, 1999, ISBN: 0-7897-2144-9, 5 pages.

"UC Berkeley Library Internet Glossary," http://www.lib/berkeley.edu/TeachingLib/Guides/Internet/Glossary.html, Jun. 7, 1997, Version via WayBack Machine (http://www.archive.org), 3 pages.

* cited by examiner

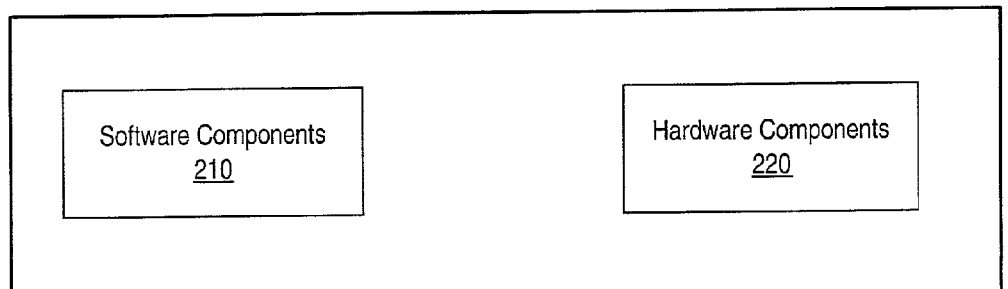
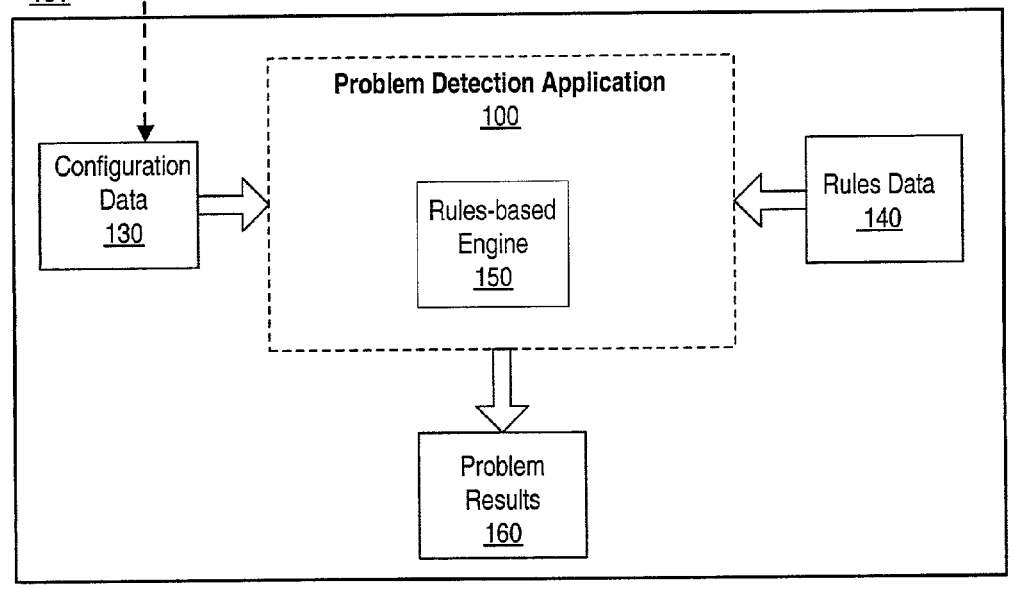
FIGURE 2

RULES-BASED CONFIGURATION PROBLEM DETECTION

BACKGROUND OF THE INVENTION

1. Field of the Invention

This invention relates to hardware and/or software configuration of computer systems, and more particularly to identifying known problems or issues with the configuration.

2. Description of the Related Art

With the growing deployment of computer system and software, applications often operate in distributed, heterogeneous environments. Processing in a complex system may be partitioned across network segments, CPU clusters, and storage locations. The configuration of a complex environment may impact many Quality of Service (QoS) factors such as reliability, availability, and serviceability. Also, due to the severe time constraints imposed by rapid deployment, and the increasing pressure from customers on suppliers to provide solutions correctly out of the box, quick identification and resolution of system configuration issues may be critical.

Numerous problems may arise while attempting to identify potential issues with the system configuration. The oversight and management of systems, especially in a complex networked environment, may rely heavily on the knowledge of system administrators and/or experts from the system service provider(s). In an effort to utilize a repeatable process derived from that knowledge, checklists, operational procedures, or other similar documentation may be developed. These types of documents may rapidly become obsolete, especially in cases of new product releases that may require modification to the documents. Unless proper notification and release of the modifications are made, documentation users may actually apply outdated knowledge resulting with undermining the use of a repeatable process. Such manual checklists and procedures may also be inefficient to utilize.

Additional problems may arise while attempting to accommodate release or maintenance of system products and technologies. The procedures used to install or verify system configuration may vary from one system to the next based on a number of factors. For example, the complexity of the network environment or the knowledge level of the individual performing the install or verify, may impact the process. Consistency and reliance on a repeatable process may not be achieved, further increasing the risk of system failures and/or unacceptable maintenance issues. Furthermore, the process may be resource and training intensive based on the different variations of configuration.

A computer system may have many different components that need to work together correctly for the system to operate properly or optimally. For example, disk firmware should correctly interact with an operating system and the operating system should correctly interact with applications and other components. Thus, there may be numerous layers of components configured in a computer system. The management and product support of these layered components may be very complex and often involves manual inspection, manual verification and other manual operations.

SUMMARY

A system and method for identifying problems with a system configuration may evaluate system configuration information against one or more configuration recommendations or rules. A rules-based problem detection application may be used for the evaluation process to generate results regarding any problems identified. The evaluated system configuration may include various types of software and hardware components which impact the operations of the computer system. For example, software components may include an operating system (OS), OS patches, OS shared system libraries, device drivers, applications, other software products running on the OS, etc. Hardware components may include processor, memory, disk drives, system controllers, system cables, storage connection switches, etc.

Rules may be any information identifying a known issue or describing a recommended or best practice configuration for the software or hardware component. A knowledge-based language or a programming language analyzer may be used to specify the rules, and thus, signify patterns in the rules. For example, an interpreted programming language may specify the recommended minimum OS patch version for the system configuration as a rule.

In one embodiment, a rules engine may be used as part of the problem detection application to evaluate configuration data against associated rules. A rules engine may be any mechanism used to recognize, interpret and process the configuration data against the rules. In one embodiment, the results of the evaluation process may be stored for further analysis. The results may include a Boolean result indicating evaluation of a rule against the associated configuration data. Whether the problem passes or fails may be indicated by the Boolean result. The problem results may include recommendations or notes for remediation of the problem. The problem results may include specific information regarding a negative or positive impact to system reliability or some other service measurement. In one embodiment, the problem results may be emailed to an email distribution list or stored in a file or database.

In one embodiment, a system that includes a processor and memory accessible by the processor may include a problem detection application. The memory may be configured to store program instructions executable by the processor to implement the problem detection application. In one embodiment, the problem detection application may include a rules engine configured to access configuration data for a system and rules data. The configuration data may comprise information about components configured for a computer system and the rules data may comprise rules for identifying system configuration issues. The rules engine may be configured to evaluate the rules from the rules data against the configuration data and generate results of any configuration issues identified for the computer system.

In one embodiment, a method for identifying issues with a system configuration may include receiving a request to validate a system's configuration. The process may include receiving rules data that includes one or more rules for identifying issues in the system's configuration. The process may include receiving configuration data that has information about the system's configuration. A rules engine may be used for evaluating the rules data against the configuration data to identify issues in the system's configuration. The method may include generating a result of any issues identified in the system's configuration.

BRIEF DESCRIPTION OF THE DRAWINGS

FIG. 2 illustrates a rules-based configuration problem detection application running on a system external to the configuration components, according to one embodiment;

Figure 1:
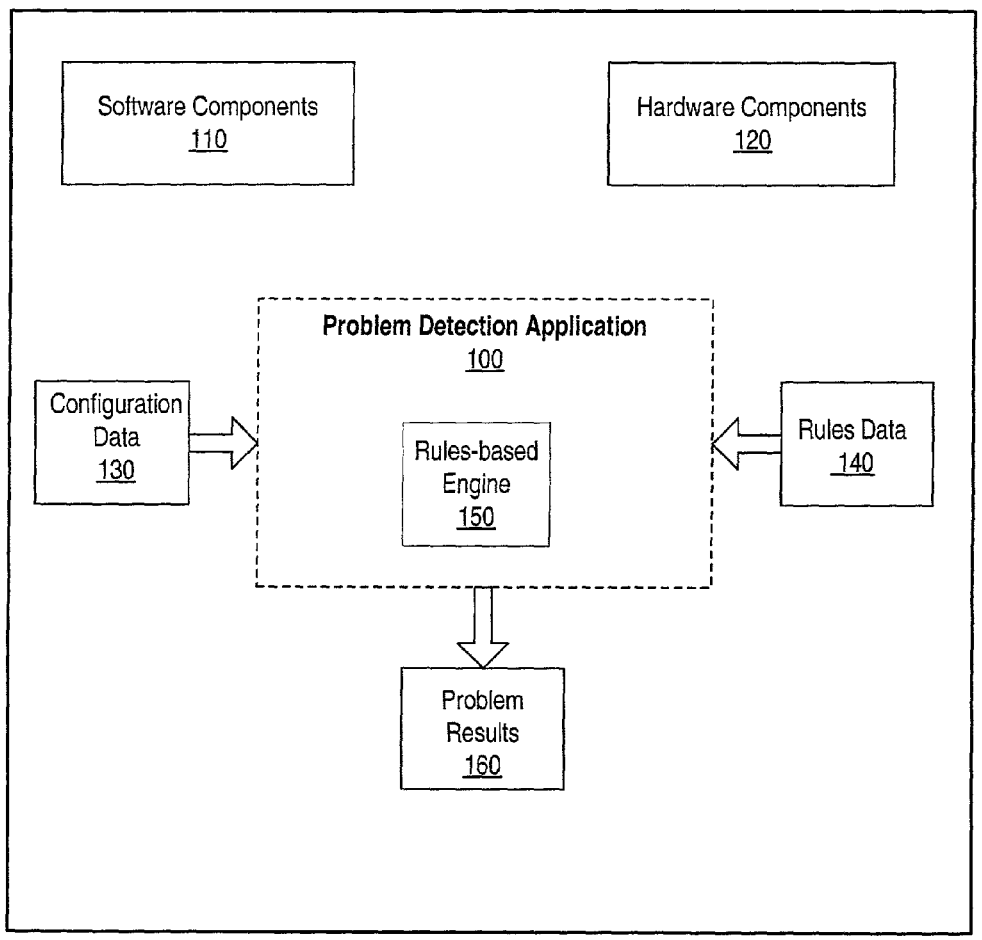
FIG. 1 illustrates a rules-based configuration problem detection application, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

A system and method for identifying problems with a system configuration may evaluate system configuration information against one or more configuration recommendations or rules. FIG. 1 illustrates one embodiment of a rules-based problem detection application 100 for identifying problems with system configuration. Computer system 101 may encompass any computing device having a processor which executes instructions from a memory medium. The configuration of such systems may include various types of software and hardware components which may impact the operations of the computer system. For example, software components 110 may include an operating system (OS), OS patches, OS shared system libraries, device drivers, applications, other software products running on the OS, etc. Hardware components 120 may include processor, memory, disk drives, system controllers, system cables, storage connection switches, etc. Configuration information for the computer system may include information indicating what software and/or hardware components are present and further describing information about each component, such as name, type, version number, date installed, etc.

The configuration information may be system data containing the existing configuration of the software and hardware components such as configuration data 130. For example, configuration data may include OS patch version is "1093339-01" or disk drive type is "MAB3091S". The configuration data may indicate "system controller" for a Secondary Storage Controller (SSC) board. Note the configuration data may contain information for components that rely on human inspection. For example, human inspection may be required to determine whether or not a system cable is plugged in or damaged. The configuration data may contain information for one or more software and/or hardware components. The configuration data may be accessed by problem detection application 100 from a source within application 100 or a source external to application 100 as depicted by a logical representation (broken line) of application 100 in FIG. 1.

Rules data 140 may include information for identifying configuration issues. In some embodiments, rules data 140 may describe a recommended configuration for the software or hardware component. Rules data 140 may include rules for specifying a potential problem, and may also include information describing the problem in further detail. For example, rules data may specify the recommended minimum OS patch version identifier or recommended disk drive type identifier for the system configuration, along with a problem description providing technical details. Rules data may include a recommendation that a SSC board identifier show "system controller" in its configuration. Analysis steps describing step-by-step actions for pinpointing the problem, or recommendations for eliminating the problem, may be included. The rules may include a severity of the problem. The rules data may contain one or more rules for one or more software and/or hardware components. The rules data may be accessed by problem detection application 100 from a source within application 100 or a source external to application 100 as depicted by a logical representation (broken line) of application 100 in FIG. 1.

The rules data may be specified using any type of language capable of being recognized during the evaluation of configuration data against the rules. A recognizer may identify patterns of the rules data. Patterns may be symbols in the rules data which can be read, recognized, and written by the recognizer. The recognizer may be able to determine where each symbol starts and stops, distinguish the symbols, and derive information based on the arrangement of the symbols. A knowledge-based language or a programming language analyzer may be used to specify the rules, and thus, signify patterns in the rules data. For example, an interpreted language similar to CLIPS or LISP, or a Java class Analyzer, may be used to specify the rules.

In one embodiment, a rules engine 150 may be used as part of problem detection application 100 to evaluate con figuration data against associated rules. A rules engine may be any mechanism used to recognize, interpret and process the configuration data against the rules. In one embodiment, the rules engine may be an application that reads the configuration and rule data, evaluates the configuration against the specified rules, and produces a result of the evaluation. In one embodiment, the rules engine may be a knowledge-based application capable of applying artificial intelligence algorithms to interpret and process the configuration data against the rules data. The detection process based on interpreting and processing the rules may be automation of consistent knowledge (representative of rules data 140) against the configuration data. Automation of consistent knowledge may apply the rules describing a recommended configuration for the software or hardware component over time. For example, the recommended configuration for the component may be derived based on past knowledge of the configuration. In another embodiment, a programming language Analyzer may be used instead of or in addition to a knowledge-based interpreter. One example is Java Analyzers. The Analyzers may be implemented in a reusable manner in order to return a detailed evaluation of rules that are not easily represented in other rules languages.

After problem detection application 100 evaluates configuration data against rules data, any issues identified in the detection process may be stored for further analysis in problem results 160. In one embodiment, the problem results may include a Boolean result indicating evaluation of a rule against the associated configuration data. Whether the problem passes or fails may be indicated by the Boolean result. The problem results may contain a Boolean result for one or more rules for one or more software and/or hardware components. The problem results may include recommendations or notes for eliminating the problem. The problem results may include specific information regarding any impact to system reliability, serviceability, availability, or other service measurements. For example, the problem results may show a reliability measurement decrease if certain configuration components are updated. In one embodiment, the problem results may be emailed to an email distribution list for additional analysis. In another embodiment, text based results may be stored in a file or a Relational Database Management System (RDBMS). The problem results may be accessed by problem detection application 100 from a source within application 100 or a source external to application 100 as depicted by a logical representation of application 100 in FIG. 1.

The following examples illustrate example rules for rules data 140. Example 1 deals with the configuration of an OS software component. A rule for the OS software component may recommend patch 109339-01 or later for configuration of OS version 5.6 or patch 103680-04 or later for configuration of OS version 5.5.1. Problem detection application 100 may return a Boolean result indicating whether the rule passes or fails. The rule may fail if the system does not have patch 109339-01 or later installed for OS version 5.6 or patch 103680-04 or later for OS version 5.5.1. Thus, a problem with the OS software component would be identified and included in the problem results. Other example follow.

EXAMPLE 1

```

# Check failed if patch 109339-01 or latter is not installed for OS 5.6
# Check failed if patch 103680-04 or latter is not installed for OS 5.5.1

(or
    (and
        (osCompare ?SunOSRev "==" "5.6")
        (patchCheck "109339" 1)
        (patchCheckInstalled ?HostId ?PatchMinNum "<" ?PatchMinRev)
    )
    (and
        (osCompare ?SunOSRev "==" "5.5.1")
        (patchCheck "103680" 4)
        (patchCheckInstalled ?HostId ?PatchMinNum "<" ?PatchMinRev)
    )
)
```

EXAMPLE 2

```

#   Get the latest version for this hard drive

(set ?Type "MAB3091S")
(set ?Ver(classSlot "MasterFirmware" ?Type "latestVersion"))

#Get the lists of disks on the host

(set ?Drives (classSlot "Host" ?HostId "diskInstances"))

#   For each disk, check for the specified type and level of firmware

(set ?DrivesOk false)
(eachElement ?diskId ?Drives
    (and
#   Get the product type and compare it to
        (set ?VProd (trim (substr (factSlot "HostDisk"
                    ?diskId "product") 1 8)))
        (compare ?VProd "==" ?Type)
#   Get the firmware revision and compare it
        (set ?FW (factSlot "HostDisk" ?diskId "revision"))
        (fmCompare ?FW "!=" ?Ver)
        (set ?DrivesOk true)
    )
)
(nop ?DrivesOk)
```

EXAMPLE 3

```
# Applicable only for 5.8

(osCompare (classSlot "Host" ?HostId "sunOSRevision") "==" "5.8")
```

EXAMPLE 4

```
#   Applicable only for Cluster 3.x

(classSlot "Host" ?HostId "isCluster")
(classSlot "HostPackage" ?HostId "SUNWscr" "isInstalled")
(match (classSlot "HostPackage" ?HostId "SUNWscr" "version") "/^3/")
```

EXAMPLE 5

```

#   Check failed since the system is an E420R and 109657-03 and higher
has not been installed

(if
    (and
        (set ?sysConfig (classSlot "Host" ?HostId "systemConfiguration"))
        (match ?sysConfig "/E420R/")
    )
```

-continued

```
(if
    (not ?InstalledOk)
    (and
        (set ?Bad1 true)
        (Bad1: optional boolean (nop ?Bad1))
        (set ?CheckPass false)
    )
)

#   Check failed since the system is not an E420R and 109657-03 and
higher has not been installed

(if
    (not ?InstalledOk)
    (and
        (set ?Bad2 true)
        (Nad2: optional boolean (nop ?Bad2))
        (set ?CheckPass false)
    )
))
```

EXAMPLE 6

```

# Set path

(set ?checkPlatform (systemControllerCheck "SunFire"))

# Examine each sc/sscname/showplatform_-d_x.out file for 'interleave-scope' variable
# If this variable is set to "across-boards", this check fails.
# If this variable is set to "within-board" or "within-cpu", this check passes

(set ?scopeOk true)
(set ?platformdomains (classSlot "Host" ?HostId "scPlatformDomains"))
(set ?failingDomains (createList))
(if ?checkPlatform
    (and
        (set ?filePath (concat "sc/" ?mainPlatform "/"))
        (eachElement ?aDomain ?platformdomains
            (and
                (set ?num (factSlot "SCDomain" ?aDomain "domainId"))
                (set ?file (concat "showplatform_-d_" (toLower ?num) ".out"))
                (set ?path (concat ?filePath ?file))
                (not (containsLine ?Path "/interleave-scope.+within-(board|cpu)/"))
                (set ?scopeOk false)
                (set ?failingDomains (appendList ?failingDomains ?file))
            )
        )
    )
)
```

EXAMPLE 7

```
(containsLine ?path (concat "/^" ?file "\\s+\\S+\\s+Active\\s+.+/i"))
```

EXAMPLE 8

```

# Check whether both SSC boards show "System Controller" in showboards_v.out file
# for their Component Type

(set ?checkFail false)
(set ?bothSysController true)
(set ?failedBoards (createList))
(set ?systemBoards (classSlot "Host" ?HostId "scBoards"))
(eachElement ?aBoard ?systemBoards
    (and
        (match (factSlot "SCBoard" ?aBoard "boardId") "/SSC/i")
        (not (match (factSlot "SCBoard" ?aBoard "componentType") "/System Controller/i"))
        (set ?bothSysController false)
    )
)

# Check whether either one is not powered on, or is in "Failed" or "Degraded" status
# If it does, the check fails

(if
    (nop ?bothSysController)
    (eachElement ?bBoard ?systemBoards
        (and
            Match (factSlot "SCBoard" ?bBoard "boardId") "/SSC/i")
            (or
                (not (match (factSlot "SCBoard" ?bBoard "power") "/On/i"))
                (match (factSlot "SCBoard" ?bBoard "status") "/(Failed|Degraded)/i")
            )
            (set ?failedBoards (appendList ?failedBoards ?bBoard))
            (set ?checkFail true)
        )
    )
)
(nop ?checkFail)
```

Rules may also include applicabilities. An applicability may indicate if a specific rule(s) is applicable to the system being evaluated. For example, if the configuration data indicates a system for which an rule applies according to an applicability for the rule, then the rule is executed. Once executed, a pass or fail condition may be generated for the rule, for example. Rules that are not applicable to the system being evaluated may be skipped (e.g. not executed by the rules engine).

As illustrated in FIG. 1, problem detection application 100 may run on the same system to which the configuration data 130 pertains. In other embodiments, as illustrated in FIG. 2, the problem detection application may run on a system other than the system(s) to which the configuration data 130 pertains. For example, problem detection application 100 may run on system 101 and evaluate the configuration of software and hardware components contained on system 201. Thus, configuration data 130 may include the configuration of software and hardware components on system 201. The logical representation of access 202 to the configuration data may be any mechanism capable of providing the configuration data for system 201 to problem detection application 100. For example, the configuration data may be uploaded to system 101 via a network connection or from a portable device.

In some embodiments, problem detection application 100 may be used after initial installation of a system, installation of a hardware or software component or at any point in time to identify potential problems with the system configuration. The installation of the system may involve a full system implementation or installation of a new hardware or software component to the system. For example, the service provider or systems administrator may install a new system or disk controller to an existing system and use problem detection application 100 to verify no problems are present with the system configuration after the installation (e.g. the newly installed disk drivers are correct for the system OS). Conversely, after a system has been operating for a period of time, problem detection application 100 may be used to detect any problems with the current configuration. Configuration issues may develop over time, for example, a new OS patch may have been released. Rules data 140 may be updated for new issues and problem detection application 100 run to detect such new issues.

Figure 3:
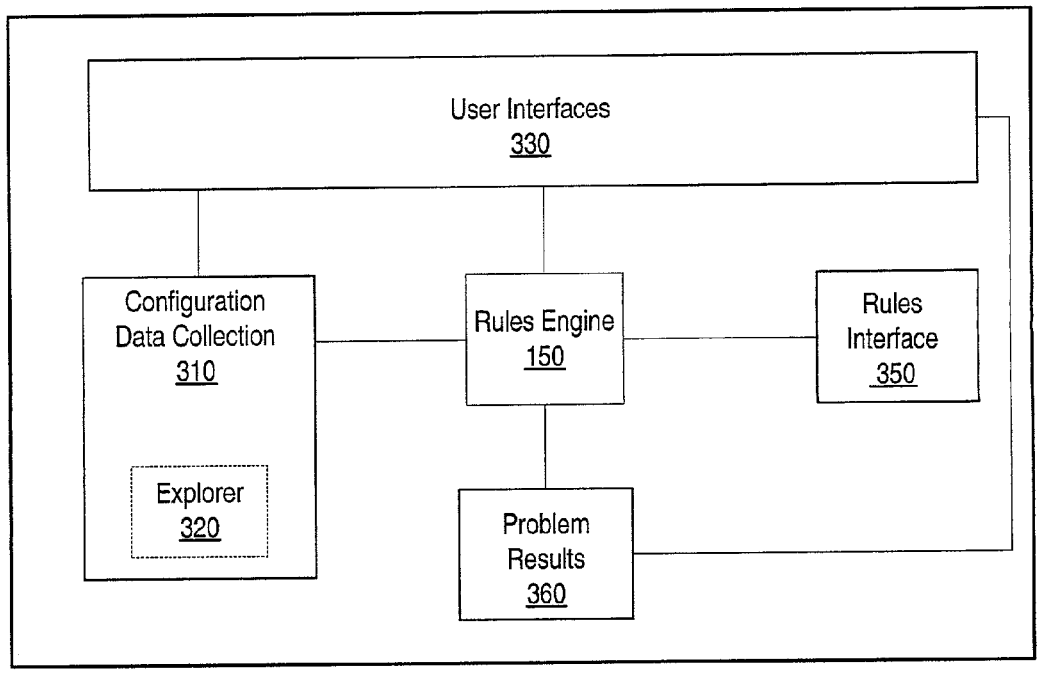
FIG. 3 illustrates exemplary user interfaces that may be coupled to a rules-based configuration problem detection application, as well as various mechanisms for accessing the configuration, rules and problem results data, according to various embodiments.

FIG. 3 illustrates a block diagram of problem detection application 100, according to one embodiment. As shown in FIG. 3, problem detection application 100 may include one or more user interfaces 330, a configuration data collection unit 310, a rules interface 350 and a results unit 360, in addition to rules engine 150. Problem detection application 300 may enable the user to manage the configuration data, rules data and problem results data through user interfaces 330. The user interfaces may be a graphical and/or command line interfaces for providing display and/or interactive access to the user. The user interfaces may be one interface or multiple interfaces. Configuration, rules and problem results data may be accessed by problem detection application 100 from a source within application 100 or a source external to application 100. The following embodiments describe exemplary mechanisms for accessing the configuration, rules and problem results data.

In one embodiment, problem detection application 100 may provide the ability to input configuration data required for rules dependent on user input (e.g. human inspection) through a user interface. For example, human inspection may be required to determine if a system cable is installed for a system cable rule and hence a user may input the system cable configuration data through a user interface. The rules data may specify a required user input response of "yes" for a system cable rule evaluating installation to the system cable. A user interface may be used to collect any configuration data that may not be accessible by problem detection application 100 from any other source.

In one embodiment, configuration data collection unit 310 may be any mechanism used to gather and/or enable access of configuration data 130 to problem detection application 100. In one embodiment, the collection of configuration data may include an uploading of data from a handheld information device or via a network connection. For example, a service provider engineer may collect the configuration data using a Palm Pilot during a service appointment. Later, the configuration data may be uploaded for access and use by problem detection application 100 utilizing a Java conduit, for example. The configuration day may be transferred for access and use by application 100 utilizing a generic conduit for data exchange between computers. In one embodiment, the collection of configuration data may be data generated and transferred via the network by some other application running on a system in a remote location. For example, an application may run on a different computer other than problem detection application 100, collect configuration data, generate the configuration data in a format understood by problem detection application 100, and initiate transfer of the data to configuration data collection unit 310 of problem detection application 100.

In one embodiment, configuration data collection unit 310 may include an explorer mechanism 320 to identify and/or collect configuration data that is accessible to problem detection application 100. Explorer 320 may be an automated configuration data collection process. In some systems, configuration data may be maintained by various source, e.g. the OS, third part software vendors, system vendor specific locations, etc. Problem detection application 100 may initiate an explorer 320 process to automatically collect and compile configuration data from one or more different sources. Explorer 320 may collect configuration data such as data location, computer system name and identifier, OS version, system type, serial number and third party product information. For example, the explorer 320 may identify a third party software product released from a different supplier other than the supplier of the computer system.

A user interface 330 may include a menu system and a display of the current rule being detected for a problem. For example, the menu may allow graphical selection of various menu operations or provide a display showing a rule that is currently being evaluated. The menu system may allow a user to edit which menu operations will be included prior to running problem detection application 100. The interface may display the percentage of rules completed as part of the detection process. For example, the interface may display a graphical percentage of rules completed. The interface may display a numerical percentage of rules completed.

Problem detection application 100 may provide various ways to manipulate and store the problem results generated during the problem detection process through user interface 330 and results unit 360. In one embodiment, a user interface may be provided to help manage the problem results data. A resolution process may include a resolution manager interface to enable the user to view, sort, and/or manipulate the results for desired presentation. In one embodiment, the results interface 360 may provide a mechanism to directly store and access the problem results data from a database. For example, the results interface may allow the problem results data to be stored and directly accessed by Oracle Relational Database System (Oracle RDBMS). The user interfaces for manipulation of the data may be interfaces developed with a RDBMS. In one embodiment, results interface 360 may provide for eXtensible Markup Language (XML) problem results to be emailed to a service provider. The service provider may use the problem results data to obtain service level metrics and trend analysis. For example, the problem results data may be used for obtaining reliability measurements to determine the long-term impact after a hardware component was replaced by a different supplier. In another embodiment, text based problem results may be stored in a file or displayed to the user. Metrics from repeated execution of a problem detection application across a span of time may also be displayed.

In one embodiment, through rules interface 350, a rules manager user interface of user interfaces 330 may enable the user to edit the rules data or input additional notes or comments regarding a problem identified by a rule. In one embodiment, a rules manager user interface may allow selection of problems to be included in the detection process. For example, a rules-based filter may be included as part of a user interface to allow selection of specific problems, and therefore specific rules. The rules data may contain an indication to include or exclude the problem in the detection process. Based on the rules-based filter, the rules data may be filtered include only rules for configuration data not relying on human inspection or rules associated only with software components. The rules-based filter may be provided by rules interface 350 and accessed through user interface 330.

In one embodiment, a feature may be provided to allow the rules data and/or rules engine 340 to remain up-to-date. The rules and rules engine may require synchronization to ensure the rules engine can recognize, interpret and process the rules data. For example, a reminder may be displayed from a user interface indicating an expiration date when the rules engine will not be able to process a rule in the rules data. The user may select whether to update the rules engine at that moment or wait until another period in time to update the rules engine. In one embodiment, the rules and/or rules engine may be automatically updated based on user selection of an update interval. For example, the update interval may be defined as quarterly and an update of the rules may automatically occur every quarter as selected by the user.

The rules engine may communicate obtain rules to be evaluated through rules interface 350. Rules interface 350 may be any mechanism that handles communication between the rules engine and rules data 140.

Figure 4:
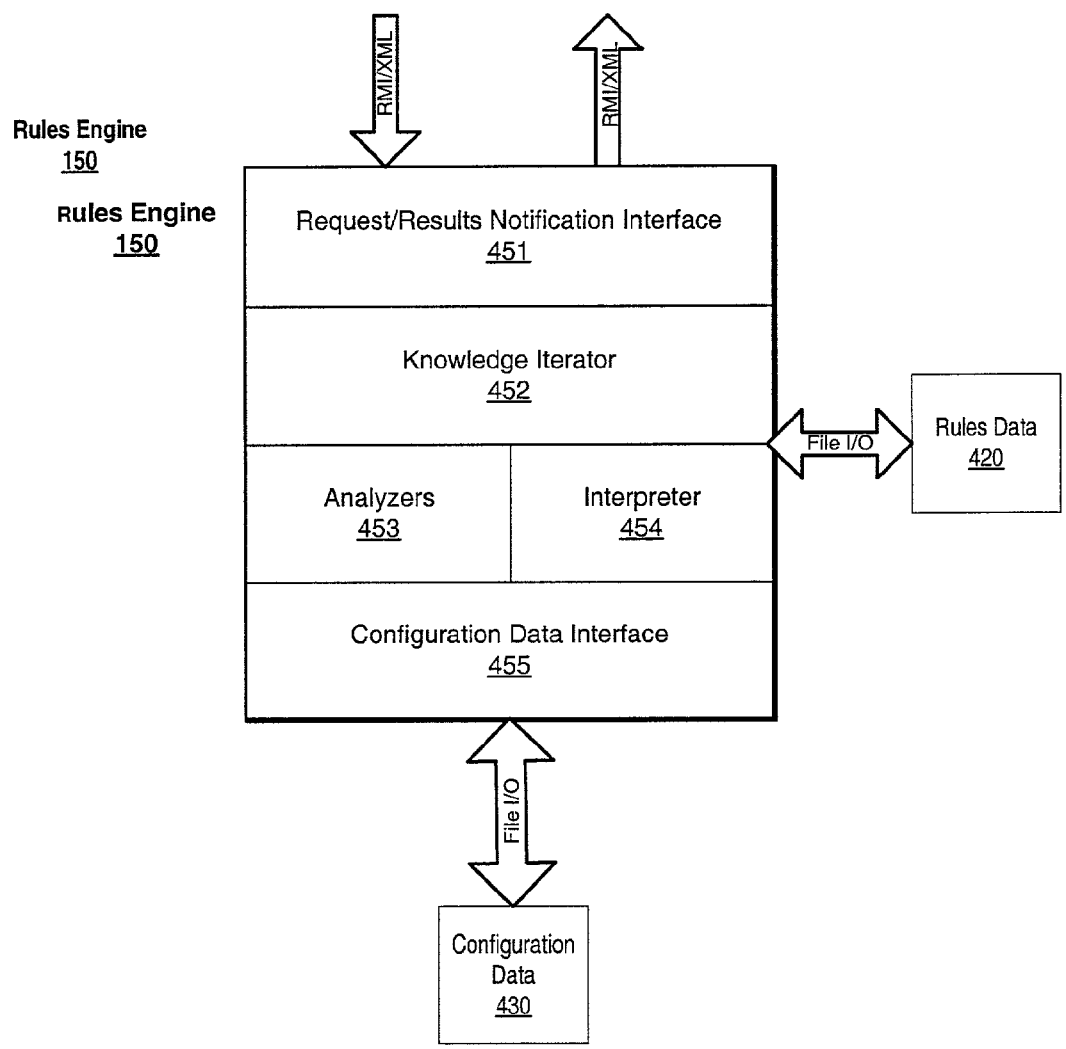
FIG. 4 illustrates a rules interface and rules engine, according to one embodiment.

FIG. 4 illustrates a block diagram of rules engine 150, according to one embodiment. The rules engine may include request/results notification interface 451, iterator 452, analyzers 453, interpreter 454 and configuration data interface 455. The request/results notification interface 451 may be configured to receive a request for the rules engine to evaluate specified configuration data against specified rules data. Request/results notification interface 451 may also provide a notification (e.g. to a user interface) of completion of results generated from a rules evaluation. The rules engine may also use the request/results notification interface to communicate an error to the problem detection application 100. Iterator 452 may parse data (e.g. XML) containing the rules and iterate through each rule as processing is completed. The rules may be sent to the analyzer(s) 453 or interpreter 454 for processing. As part of the interpreter, a facts repository may be used to store facts on the configuration data after the configuration data is parsed. Facts may represent past knowledge about the configuration data. Rules may then be evaluated to a Boolean result based on the predicate and operator Boolean values against facts used in the rules. The Boolean result may be used to determine if the rule associated with the problem passes or fails. Results may by returned through the request/results notification interface. The results may be stored through results interface 360 and/or displayed through user interface 330.

Figure 5:
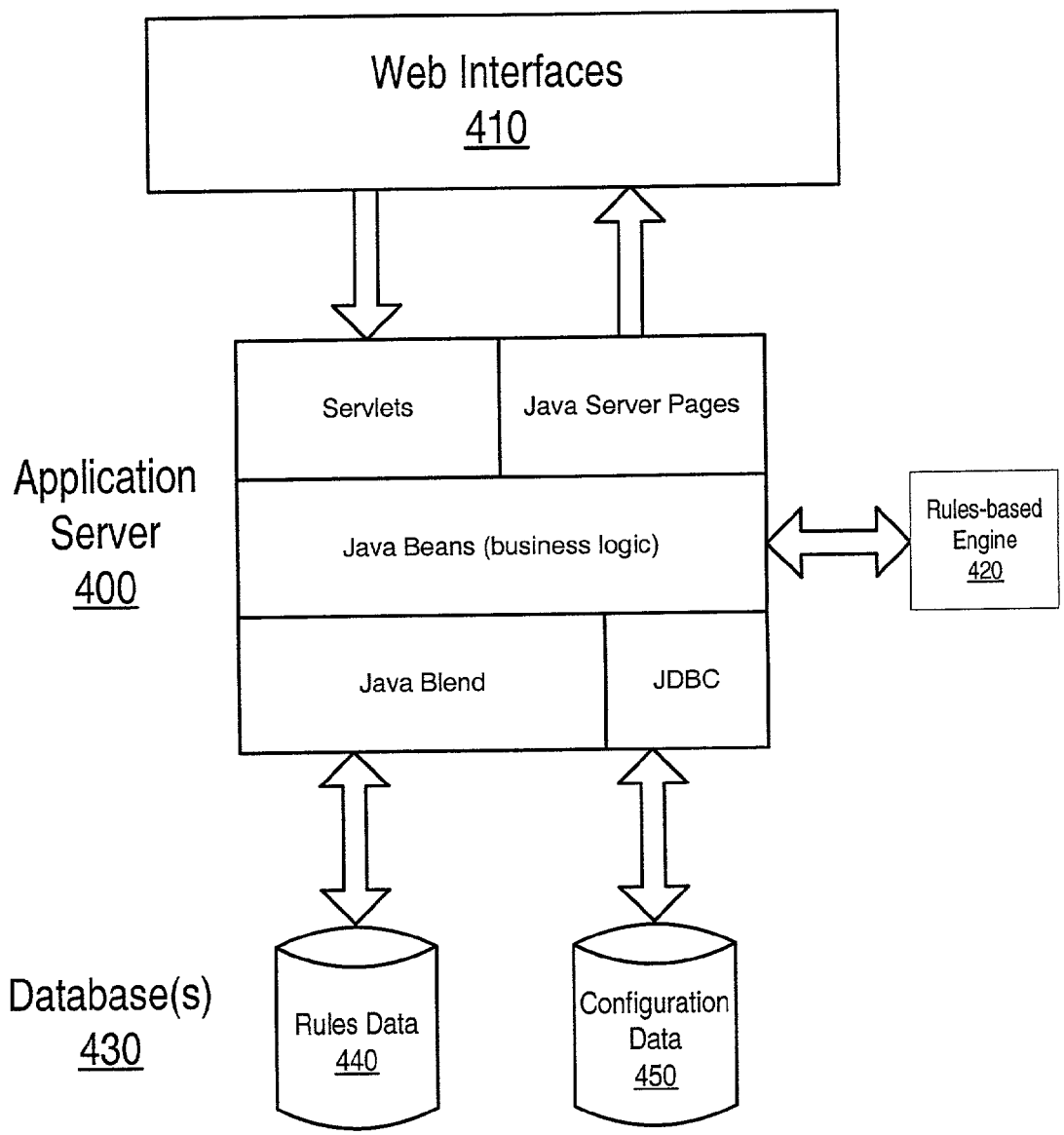
FIG. 5 illustrates a problem detection application operating in an application server environment, according to one embodiment.

FIG. 5 illustrates one embodiment application server environment for a problem detection application. For example, the problem detection application may operate in a Java-based application server environment with access to other applications running across a network. In addition to rules engine 150, a Web user interface(s), as represented by 410, may be coupled to applications within the environment. The application server may include Java servlets, Java Server Pages (JSP), Java Beans, Java Blend, and/or Java Database Connectivity (JDBC). Referring back to FIG. 3 by way of example, the user interface 330 may be implemented using Java servlets for receiving requests to evaluate a system's configuration, and Java Server Pages for displaying results, etc. Java Beans may be used for implemented other logic, such as explorers, in the problem detection application. Java Blend and JDBC may be used for accessing rules data and configuration data. For example, rules data 440 or configuration data 450 may be stored in a database such as Oracle RDBMS or a simple flat file structure.

Figure 6:
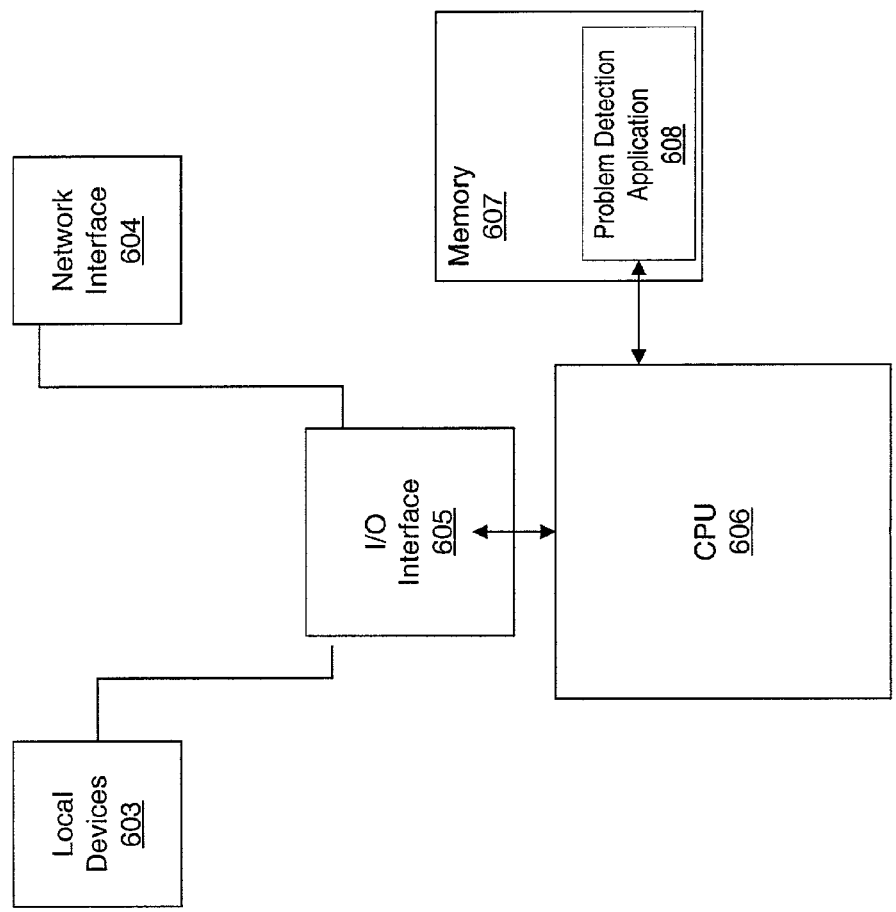
FIG. 6 illustrates a computer system suitable for implementing a problem detection application, according to one embodiment.

Suitable for implementing various embodiments, FIG. 6 illustrates a computer system 600 that may contain the hardware and/or software components for which configuration data may be used in the detection process of a problem detection application 608 running on this system. Alternative, the system of FIG. 6 may be the system which executes problem detection application 100 to evaluate system configurations supplied for other systems. The computer system may include at least one central processing unit (CPU) or processor 606. The CPU may be coupled to a memory 607 storing program instructions to implement problem detection application 100 as described above. The memory 607 is representative of various types of possible memory media which may also be referred to as computer readable media. Examples are hard disk storage, floppy disk storage, removable disk storage, flash memory or random access memory (RAM). The terms memory and memory medium may include an installation medium, e.g., a CD-ROM, floppy disk, or computer system memory such as SDRAM. The memory medium may include other types of memory as well, or combinations thereof. For one embodiment, the memory media may include storage of problem detection application 608. For one embodiment, the memory media may include storage of the rules data, configuration data, and/or problem results data derived from execution of a problem detection application. The system may also include an I/O interface to various peripheral I/O or local devices 603 (e.g. hard disk, monitor, keyboard, mouse, etc) and a network interface 604 for coupling the system to a network.

In different embodiments, the computer system may take various forms, including a personal computer system, desktop computer, mainframe computer system, another suitable device, or combinations thereof. In general, the term computer system may be broadly defined to encompass any device having a processor which executes instructions from a memory medium. The computer system may be configured as a cluster of computer systems. In one embodiment, the problem detection application may operate in stand-alone mode on one computer system. In one embodiment, the problem detection application may include a user interface to select which computer systems will be included in the detection process. For example, single, multiple, and/or a cluster configuration of systems may be included in the detection process.

The computer system may be coupled to a network through network interface 604, which may provide access to a plurality of network attached devices, such as storage devices or other computer peripheral devices. The CPU may acquire instructions and/or data through an input/output interface 605. Through the input/output interface, the CPU may also be coupled to one or more local devices 603, such as local input/output devices (video monitors or other displays, track balls, mice, keyboards, etc.), local storage devices (hard drives, optical storage devices, etc.), local printers, plotters, scanners, and any other type of local I/O devices for use with a computer system.

Figure 7:
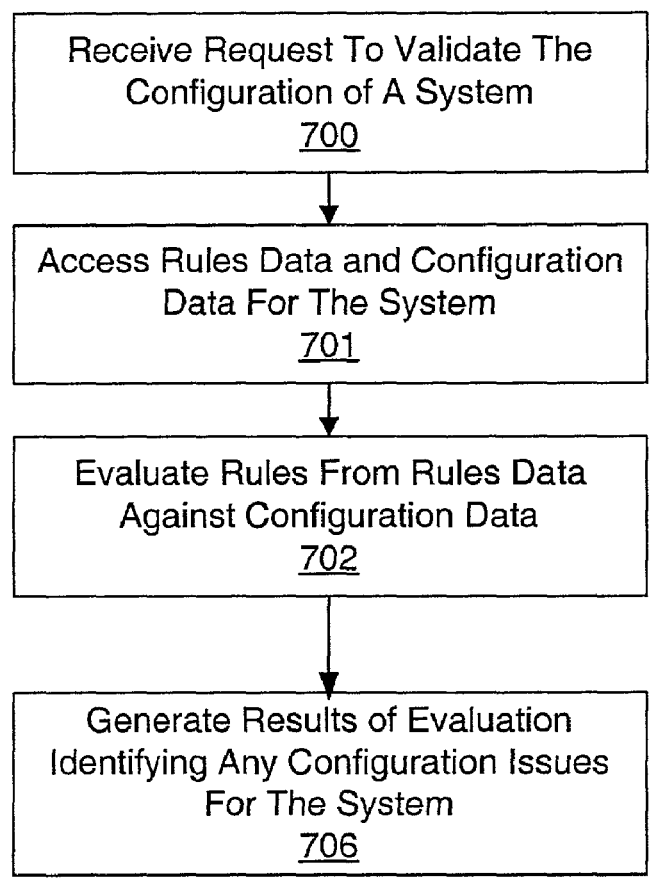
FIG. 7 is a flowchart representing an exemplary method from a high-level perspective for a problem detection application, according to one embodiment.

As depicted in FIG. 7, a flowchart represents one embodiment of a method for evaluating configuration data against rules data to identify problems with a system configuration. A request is received by the problem detection application to validate the configuration of a system in 700. The request may specify a source for rules data and a source for configuration data. I some embodiment, the request may indicate one or more systems for which configuration data is to be evaluated against specified rules data. In response to the request, the problem detection application may access the indicated rules data and configuration data for the system(s) being analyzing as part of the detection process in 701. The rules data is then evaluated against the configuration data, as indicated at 702. In one embodiment, the evaluation of the configuration data against associated rules data may be performed by a rules engine as described above. A result of the evaluation identifying any configuration issues is provided, as indicated at 706. Whether each issue passes or fails may be indicated by a Boolean result, in one embodiment. The issues or problems identified in the evaluation are generated as results and may be stored for further analysis.

Figure 8:
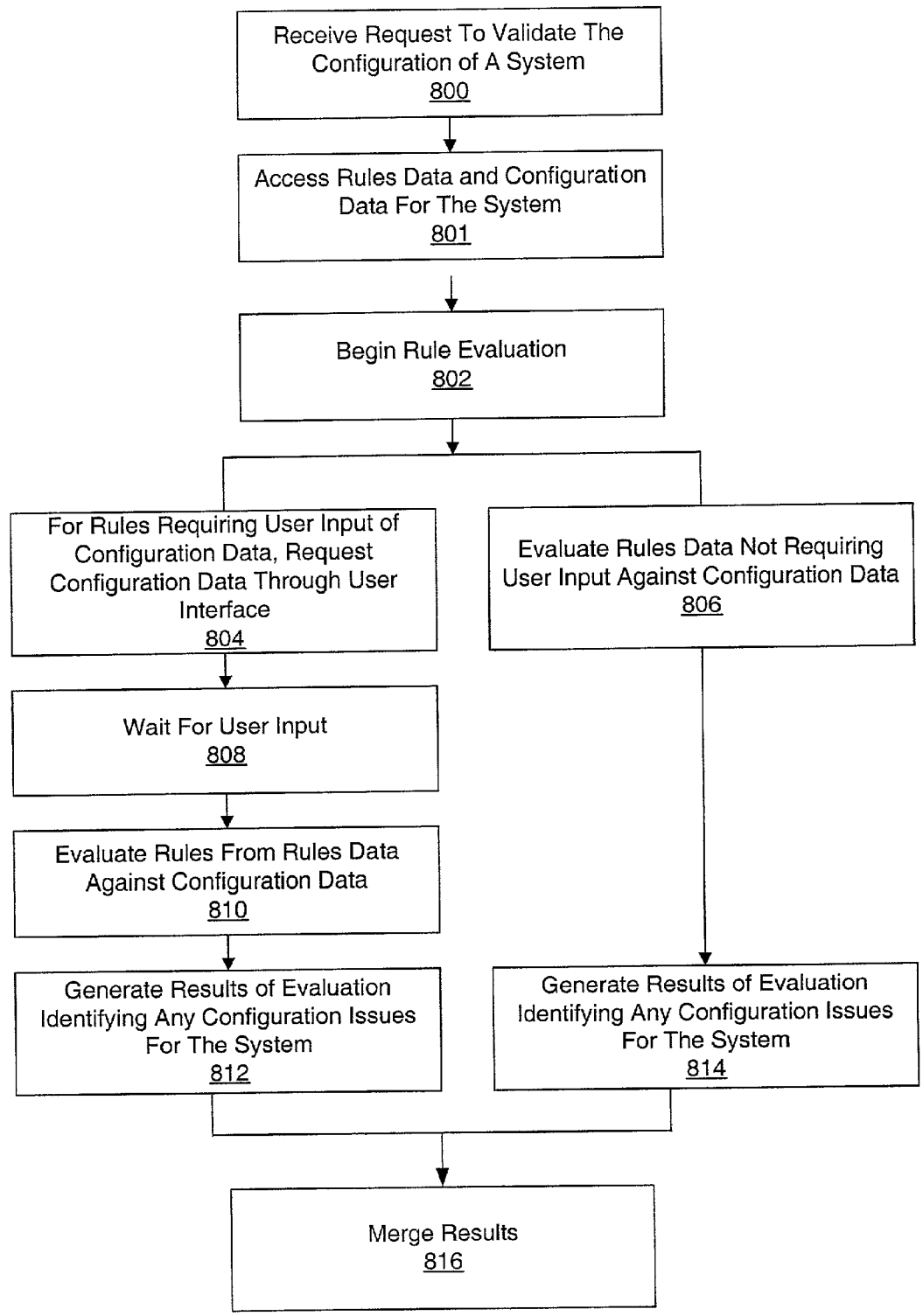
FIG. 8 is a flowchart representing an exemplary method for a problem detection application, according to one embodiment.

As depicted in FIG. 8, a flowchart represents one embodiment of a method for evaluation of configuration data against rules data for rules requiring user input and/or rules not requiring user input. A request is received by the problem detection application to validate the configuration of a system in 800. The problem detection application may access the rules data and configuration data for the system being analyzing as part of the detection process in 801. The evaluation of the configuration data against associated rules may be begun, e.g. by a knowledge-based system or rules engine, in 802. In one embodiment, the detection process for evaluating rules not relying on user input may operate in parallel to the detection process evaluating rules relying on use input. For example, for rules dependent on user input, a request for the user input may be made through a user interface and the evaluation of the rule requiring the user input may be put on hold waiting for the input, as indicated at 804 and 808. Once user input is received, the evaluation of rules relying on user input may then be performed in 810. Rule evaluations not dependent on user input may proceed in parallel without being held-up by the user input dependent rules, as indicated at 806. The configuration problems or issues identified in both of the evaluations are generated as results in 812 and 814. The results may be merged and stored for further analysis and/or display in 816.

Note that the flow charts described herein represent exemplary embodiments of methods. The methods may be implemented in software, hardware, or a combination thereof. The order of method may be changed, and various elements may be added, reordered, combined, omitted, modified, etc. For example in FIG. 8, the user interface may requests configuration data in 804 before, after or during processing of rules by the rules engine in 806. As an additional example, generation of problem results in 812 may be performed before the problem results are updated or stored in 814.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
a processor;
a memory accessible by the processor and configured to store program instructions executable by the processor to implement a problem detection application, wherein the problem detection application comprises:
a rules engine configured to access configuration and rules data, wherein the configuration data comprises information about components configured for a computer system and the rules data comprises rules for identifying system configuration issues;
wherein the rules engine comprises a knowledge-based interpreter to evaluate rules specified in a knowledge-based rules language, and a programming language analyzer to evaluate rules that are not specified in a knowledge-based rules language;
wherein the rules engine is configured to evaluate the rules from the rules data against the configuration data and generate a result of any configuration issues for the computer system.

2. The system as recited in claim 1, wherein the configuration data comprises information about software components installed on the computer system.

3. The system as recited in claim 1, wherein in the configuration data comprises information about hardware components installed in or connected to the computer system.

4. The system as recited in claim 1, wherein the rules data comprises a rule to determine whether or not an unsupported device is connected to the computer system.

5. The system as recited in claim 1, wherein the configuration issues comprise whether or not incorrect firmware is installed for a device attached to the computer system.

6. The system as recited in claim 1, wherein the configuration issues identify if a newer version is available for a component installed on or connected to the computer system.

7. The system as recited in claim 1, wherein the configuration issues identify known bugs for a component installed on or connected to the computer system.

8. The system as recited in claim 1, wherein the configuration issues comprise whether or not a current operating system patch is installed on the computer system.

9. The system as recited in claim 1, wherein the configuration issues comprise data affecting reliability, availability or serviceability for the computer system.

10. The system as recited in claim 1, wherein the rules from the rules data are written in an interpreted rules language including operators and predicates for identifying the configuration issues, wherein the rules engine is configured to interpret the rules language.

11. The system as recited in claim 1, wherein the rules engine is configured to access the configuration data from a configuration source stored on a storage device for the computer system.

12. The system as recited in claim 1, wherein the problem detection application further comprises a configuration explorer to collect configuration data for the computer system.

13. The system as recited in claim 1, wherein the problem detection application is configured to receive the configuration data over a network connection.

14. The system as recited in claim 1, wherein the problem detection application is configured to receive a request to validate the computer system's configuration, wherein the request identifies a source for the configuration data and a source for the rules data.

15. The system as recited in claim 1, wherein the wherein the rules data is stored on a storage device for the computer system.

16. The system as recited in claim 15, wherein the rules data is configured to be updated over a network connection.

17. The system as recited in claim 1, wherein the problem detection application further comprises a user interface configured to display the result generated by the rules engine.

18. The system as recited in claim 1, wherein the problem detection application further comprises a user interface configured to request configuration data from a user.

19. The system as recited in claim 18, wherein the rules engine is configured to evaluate configuration data against the rules while concurrently receiving and evaluating configuration data input through the user interface against the rules.

20. The system as recited in claim 19, wherein one or more of the rules indicate configuration data to be requested from the user through the user interface.

21. The system as recited in claim 1, wherein the problem detection application further comprises a user interface to update the rules data and rules engine.

22. A method for identifying issues with a system configuration, comprising:
receiving a request to validate the system configuration, wherein the system configuration comprises components in a computer system;
receiving rules data comprising one or more rules for identifying issues in the system configuration;
receiving configuration data comprising information about the system configuration;
a rules engine evaluating the rules data against the configuration data to identify issues in the system configuration, wherein the rules data comprises rules specified in a knowledge-based rules language and rules that are not specified in a knowledge-based rules language, wherein said evaluating comprises evaluating the rules specified in a knowledge-based rules language using a knowledge-based interpreter and evaluating the rules that are not specified in a knowledge-based rules language using a programming language analyzer; and
generating a result of any issues identified in the system configuration.

23. The method as recited in claim 22, wherein the configuration data comprises information about software components installed on the computer system.

24. The method as recited in claim 22, wherein the configuration data comprises information about hardware components installed in or connected to the computer system.

25. The method as recited in claim 22, wherein the rules data comprises a rule to determine whether or not an unsupported device is connected to the computer system.

26. The method as recited in claim 22, wherein the rules data comprises a rule to determine whether or not incorrect firmware is installed for a device attached to the computer system.

27. The method as recited in claim 22, wherein the rules data comprises a rule to identify if a newer version is available for a component installed on or connected to the computer system.

28. The method as recited in claim 22, wherein the rules data comprises a rule to identify known bugs for a component installed on or connected to the computer system.

29. The method as recited in claim 22, wherein the rules data comprises a rule to determine whether or not a current operating system patch is installed on the computer system.

30. The method as recited in claim 22, wherein the rules data comprises a rule to identify an issue affecting reliability, availability or serviceability for the computer system.

31. The method as recited in claim 22, wherein the rules from the rules data are written in an interpreted rules language including operators and predicates for identifying issues in the system configuration, wherein the rules engine evaluating the rules comprises the rules engine interpreting the rules according to the rules language.

32. The method as recited in claim 22, wherein said receiving the configuration data comprises receiving the configuration data from a configuration source stored on a storage device for the computer system.

33. The method as recited in claim 22, further comprising:
a configuration explorer collecting configuration information for the computer system;
wherein said receiving the configuration data comprises receiving the configuration information from the configuration explorer.

34. The method as recited in claim 33, wherein said receiving the configuration data comprises receiving the configuration data over a network connection.

35. The method as recited in claim 22, wherein the request to validate the system configuration identifies a source for the configuration data and a source for the rules data.

36. The method as recited in claim 22, wherein said receiving rules data comprises receiving the rules data from a storage device for the computer system.

37. The method as recited in claim 36, further comprising: updating the rules data over a network connection.

38. The method as recited in claim 22, further comprising displaying, through a user interface, the result of any issues identified in the system configuration.

39. The method as recited in claim 22, wherein one or more of the rules indicate a portion of the configuration data to be requested from a user through a user interface, the method further comprising:
requesting the indicated portion of the configuration data from the user through the user interface; and
the user interface receiving the indicated portion of the configuration data.

40. The method as recited in claim 39, wherein said rules engine evaluating comprises the rules engine evaluating a portion of the configuration data not requested from the user against the rules data while waiting for the user interface to receive the portion of the configuration data indicated by one or more of the rules to be requested from the user.

41. The method as recited in claim 22, further comprising receiving a request from a user interface to update the rules data and rules engine.

42. A system, comprising:
a processor;
a memory accessible by the processor and configured to store program instructions executable by the processor to implement a problem detection application, wherein the problem detection application comprises:
  a rules engine configured to access configuration and rules data, wherein the configuration data comprises information about components configured for a computer system and the rules data comprises rules for identifying system configuration issues;
  wherein the rules engine is configured to evaluate the rules from the rules data against the configuration data and generate a result of any configuration issues for the computer system; and
  a user interface configured to request configuration data from a user;
  wherein, for rules not requiring user input, the rules engine is configured to evaluate configuration data against the rules while waiting to receive configuration data input through the user interface for rules requiring user input of configuration data.

43. The method as recited in claim 42, wherein one or more of the rules indicate configuration data to be requested from the user through the user interface.

44. A method for identifying issues with a system configuration, comprising:
  receiving a request to validate the system configuration, wherein the system configuration comprises components in a computer system;
  receiving rules data comprising one or more rules for identifying issues in the system configuration;
  receiving configuration data comprising information about the system configuration;
  requesting configuration data from a user through a user interface, wherein one or more of the rules indicate the configuration data to be requested from the user through the user interface;
  a rules engine evaluating the rules data against the configuration data to identify issues in the system configuration, wherein said rules engine evaluating comprises the rules engine evaluating the configuration data not requested from the user against the rules data while waiting for the user interface to receive the configuration data indicated by one or more of the rules to be requested from the user; and
  generating a result of any issues identified in the system configuration.

* * * * *